United States Patent
Melhuish et al.

(10) Patent No.: US 6,571,936 B1
(45) Date of Patent: Jun. 3, 2003

(54) CHAIN AND FLIGHT CONVEYOR

(75) Inventors: James J. Melhuish, Franklin, PA (US); Gregory M. Chandler, Franklin, PA (US)

(73) Assignee: Joy M M Delaware, Inc, Wilmington, DE (US)

( * ) Notice: Subject to any disclaimer, the term of this patent is extended or adjusted under 35 U.S.C. 154(b) by 0 days.

(21) Appl. No.: 10/135,653

(22) Filed: Apr. 30, 2002

(51) Int. Cl.⁷ .............................................. B65G 19/20
(52) U.S. Cl. ...................... 198/731; 198/729; 198/733
(58) Field of Search ................. 198/729, 731, 198/733

(56) References Cited

U.S. PATENT DOCUMENTS

| | | | | |
|---|---|---|---|---|
| 1,511,221 A | * | 10/1924 | Joy ............................. | 198/731 |
| 1,686,567 A | * | 10/1928 | Levin ......................... | 198/731 |
| 2,575,610 A | * | 11/1951 | Ball ............................ | 198/731 |
| 2,627,338 A | * | 2/1953 | Vodoz ........................ | 198/731 |
| 2,756,868 A | * | 7/1956 | Russel ....................... | 198/733 |
| 3,089,579 A | * | 5/1963 | Beck ........................... | 198/733 |
| 3,103,275 A | * | 9/1963 | Rollins ....................... | 198/733 |
| 4,388,990 A | * | 6/1983 | Michalik .................... | 198/645 |
| 4,747,481 A | * | 5/1988 | Gorlov et al. .............. | 198/731 |
| 4,927,002 A | * | 5/1990 | Springman ............... | 198/487.1 |
| 4,950,398 A | * | 8/1990 | Wiegand et al. ........... | 210/232 |
| 5,000,310 A | | 3/1991 | Edmondson | |
| 5,088,594 A | | 2/1992 | Edmondson | |
| 5,562,279 A | * | 10/1996 | Gillieron ................. | 198/473.1 |

FOREIGN PATENT DOCUMENTS

| | | | | |
|---|---|---|---|---|
| DE | 33 05 387 | * | 8/1984 | ................. 198/731 |
| GB | 2 102 756 | * | 2/1983 | ................. 198/731 |
| JP | 5-286540 | * | 5/1993 | ................. 198/731 |

* cited by examiner

Primary Examiner—Douglas Hess
(74) Attorney, Agent, or Firm—James Earl Lowe, Jr.

(57) ABSTRACT

A chain and flight conveyor adapted to be driven by a toothed sprocket comprising a pair of spaced apart, parallel driving chains, each of the driving chains comprising roller links having at least one end surface which may be drivingly engaged by the teeth of the sprocket. The roller links also have internal apertures defining drive surfaces which may be drivingly engaged by the teeth of the sprocket. The driving chains further include connecting links coupled to and interconnecting the roller links; and pins pivotally connecting the connecting links to the roller links. A predetermined corresponding number of the pins on each of the chains comprises extended flight attachment pins having pin extensions facing the opposite chain. A plurality of conveying flights are connected between the corresponding number of the pin extensions, the flights comprising a bar member having two opposite ends, four sides and a bottom surface. The bar member bottom surface has at least one indentation provided on the bar member ends, each of the indentations being adapted to receive its respective pin extensions. The flight further includes a bolt extending through the flight sides forming the indentation, the bolt being secured to the flight so that the pin extensions are held in the indentations.

3 Claims, 3 Drawing Sheets

CHAIN AND FLIGHT CONVEYOR

BACKGROUND OF THE INVENTION

1. Field of the Invention

The present invention relates to a chain and flight conveyor for use in conveying materials in the mining industry, and, in particular, to an improved design for the attachment of flights to conveyor chains.

2. Description of the Prior Art

In the process of underground mining, material is removed from a seam and transferred between machines which employ conveyors. Mined material is often transported and conveyed in shuttle cars or rock crushers that have a flat deck and conveyor chains which are designed specifically to load and unload the material there from. In most applications, the conveyor chains in the shuttle cars consist of two drive chains which are positioned on the extreme outer borders of the conveying decks of the cars. The drive chains consist of roller links, which contact the drive sprockets of the machine, and connecting links which are positioned between the roller links. In addition, the conveyor chains have flights which are fixed to the two drive chains and are positioned between the two chains. These flights are usually made of steel and can be a welded, tubular design or a solid, one piece design. The conveyor chain flights are positioned along the drive chains in a spacing designed to efficiently move material in the shuttle car. The flights are usually connected to the drive chains by inserting a male member on the ends of the flights through slots which are located in the roller links of the drive chains.

The prior designs have had disadvantages in several respects. In most previous designs, attachment and removal of the flights from the conveyor chains has been difficult, many times necessitating removal of the chain links to replace a flight. The drive chains in most prior designs must be moved from their normal operating position on the sprockets in order to connect the flights to the chains. In addition, forces experienced during the operation of a shuttle car which destroy the flights are transferred to the drive chains and often cause failures of those chains.

One prior art conveyor chain design appears in French Patent No. 665,420 issued to Naranovitch. That patent teaches of a conveyor chain in which the links include individual wheels. Certain links are designed differently and have a male extension fitting into a vertical U-shaped hinge element on the end of the flight. The attachment is secured by a pin. This patent, however, does not relate to a roller link arrangement which is driven by a drive gear. Also, the pins interconnecting the flights and the modified links are subjected to pure shear forces. Another design for a conveyor chain appears in U.S. Pat. No. 2,575,610 issued to Ball. That patent discloses parallel chains having flights with a male projection member thereof fitting into openings in predetermined chain links. This projection is slightly smaller than the opening thereby allowing for a small degree of tilt. Thus, the flight is pivotally connected to the side chains and replacement of flights requires that the chain be removed from the drive sprockets to remove a flight. Yet another design appears in U.S. Pat. No. 3,089,579 issued to Beck. The Beck patent teaches a conveyor flight with a removable, outwardly projecting male extension member which fits into openings in certain links on the chain. This extension is fastened to the flight by means of an interlocking tongue and groove mechanism fastened by bolts. As such, the flight may be removed from or attached to the conveyor chain without disturbing the chain tension or removing the entire load. However, in this apparatus the male extension member enters the conveyor chain and prohibits engagement of the conveyor drive sprocket with predetermined links along the chain. In yet another design, the ends of each flight include longitudinally extending bores, and journal pins that connect connecting links to roller links extend into the bores. As in the other earlier designs, the chain must be disassembled in order to replace the flight.

Edmondson U.S. Pat. No. 5,000,310 addresses many of the short comings of the above designs by providing a special link that replaces some of the roller links, the special link including a male member that extends inwardly toward the other chain, with specially designed flights having female ends that are positioned around the male extensions of the special links. In addition to the requirement of having a special link, this design further has the disadvantages of having the joint between the male member and the female ends exposed to the material in the flight conveyor, as well as having the principal piece, a bolt and nut that holds the female end on the male member, exposed to the materials.

The subject invention is directed toward an improved design for attachment of flights to a chain and flight conveyor which overcomes, among others, the above discussed problems and which provides for a more useful means of flight attachment which does not require a disruption of the conveyor chain for flight replacement and which allows all roller links to be engaged by the conveyor chain drive gears of the shuttle car. This new design enables attachment of the flights to the drive chains without repositioning the drive chains from their normal operating position.

SUMMARY OF THE INVENTION

In accordance with the present invention, there is provided an improved design for a chain and flight conveyor. Two drive chains are positioned on the perimeter of a flat horizontal deck of a shuttle car used in mining operations. Flights run between the chains and sweep material along the deck. The flights are usually made of steel and can be a welded, tubular design or a solid, one piece design.

More particularly, the invention provides a chain and flight conveyor adapted to be driven by a toothed sprocket comprising a pair of spaced apart, parallel driving chains, each of the driving chains comprising roller links having at least one end surface which may be drivingly engaged by the teeth of the sprocket. The roller links also have internal apertures defining drive surfaces which may be drivingly engaged by the teeth of the sprocket. The driving chains further include connecting links coupled to and interconnecting the roller links, and pins pivotally connecting the connecting links to the roller links.

A predetermined corresponding number of the pins on each of the chains comprises extended flight attachment pins having pin extensions facing the opposite chain. A plurality of conveying flights are connected between the corresponding number of the pin extensions, the flights comprising a bar member having two opposite ends, four sides and a bottom surface. The bar member bottom surface has at least one indentation provided on the bar member ends, each of the indentations being adapted to receive its respective pin extensions. The flight further includes a bolt extending through the flight sides forming the indentation, the bolt being secured to the flight so that the pin extensions are held in the indentations.

Accordingly, the present invention provides solutions to the aforementioned problems encountered in the utilization of chain and flight conveyors in shuttle cars. As this invention provides flight attachment links with extended pins to which the flights are attached, the problems caused by the necessity to remove or disrupt the conveyor chains to replace or repair flights are alleviated.

These and other details, objects, and advantages of the invention will become apparent as the following description of the preferred embodiment thereof proceeds.

Figure 1:
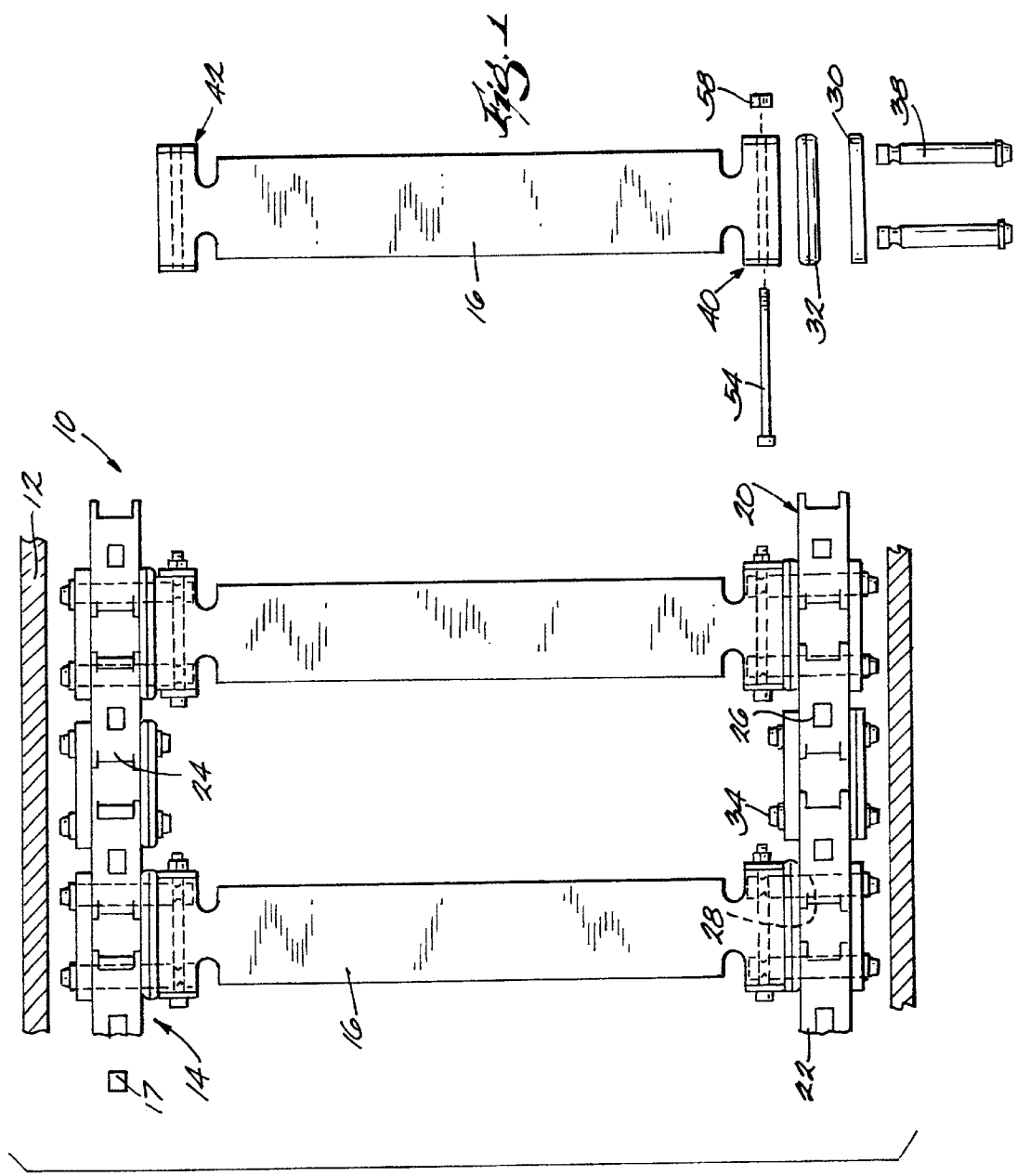
FIG. 1 is a plan view of an assembled section of a flight conveyor chain with two flights attached, and an exploded view of part of the flight conveyor chain.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DESCRIPTION OF THE PREFERRED EMBODIMENT OF THE INVENTION

Referring now to the drawings wherein the showings are for purposes of illustrating the present preferred embodiments of the invention only and not for purposes of limiting same, the figures show a chain and flight conveyor assembly, generally designated as 10.

More particularly and with reference to FIG. 1, there is shown a conveyor chain 10 which may ride along a conveying deck 12 of, for example, a shuttle car or rock crusher. The conveyor chains 10 consist of two (2) drive chains 14 which are positioned on the extreme outer borders of the conveying deck 12 of the shuttle car and are connected by flights 16. The conveying deck 12 thus serves to confine the flights 16 and chains 14 so that the chains 14 can not move away from the ends of the flights 16. Flights 16 ride along the deck 12 to sweep mined material there along. A drive sprocket 17 of the shuttle car drivingly engages each drive chain 14 at each link thereof as described herein below.

Each drive chain 14 includes a plurality of links 20 in the forms of roller links that are unitary links having longitudinal spaced apart side members 22 and spaced lateral cross members 24 which define an open area 26. As such, the roller links 20 may be engaged by the drive sprocket on the outer surfaces of the lateral cross members 24 as well as in the open area 26. The cross members 24 are additionally provided with lateral bores 28. As shown in FIG. 1, in the drive chains 14, the roller links 20 are interconnected by outer connecting links 30 and inner connecting links 32 by means of journal pins 34 which are retained by retaining rings 36 (see FIG. 2).

Figure 2:
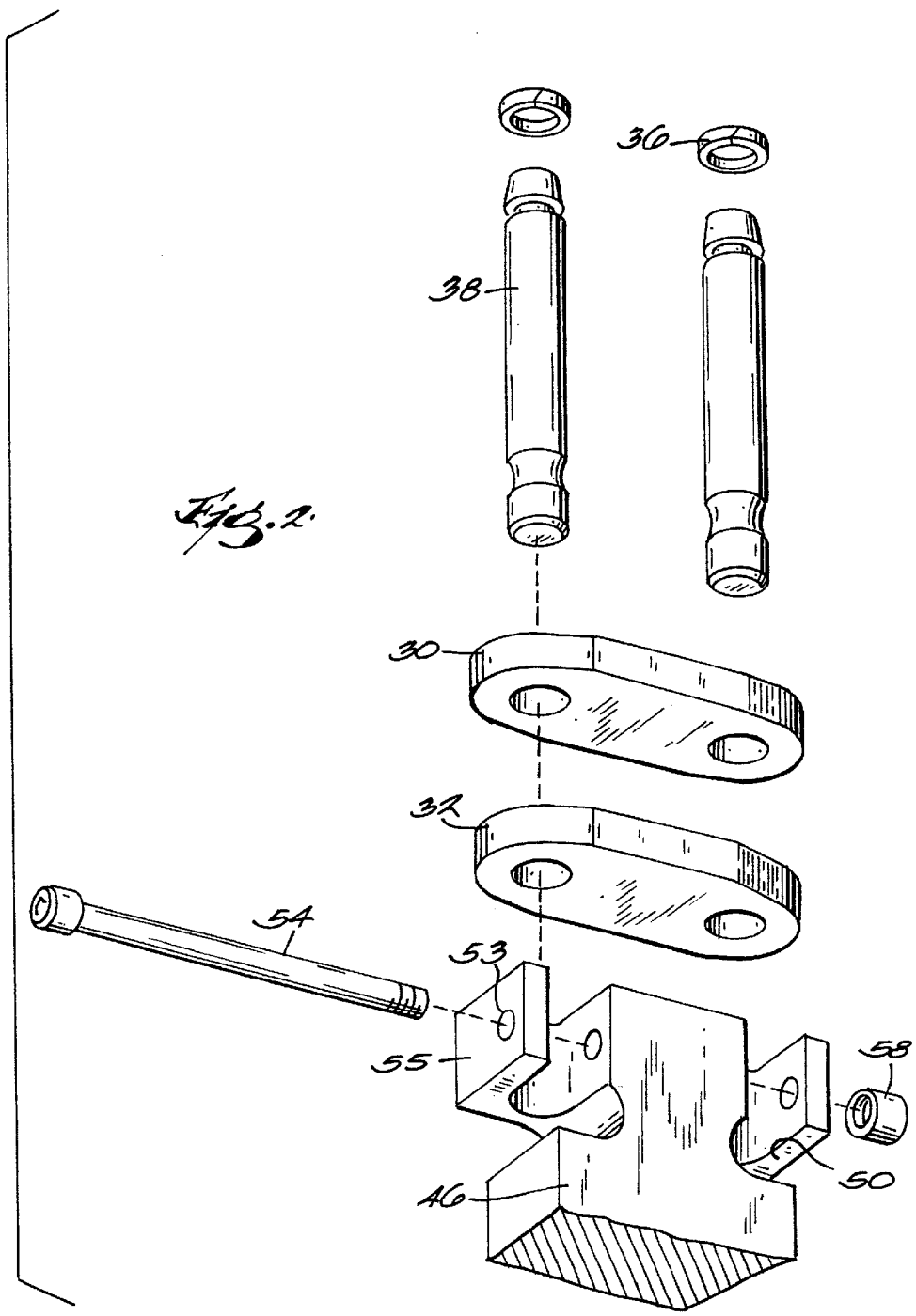
FIG. 2 is an exploded.view of the bottom surface of the end of the flight and part of the drive chain.
Figure 3:
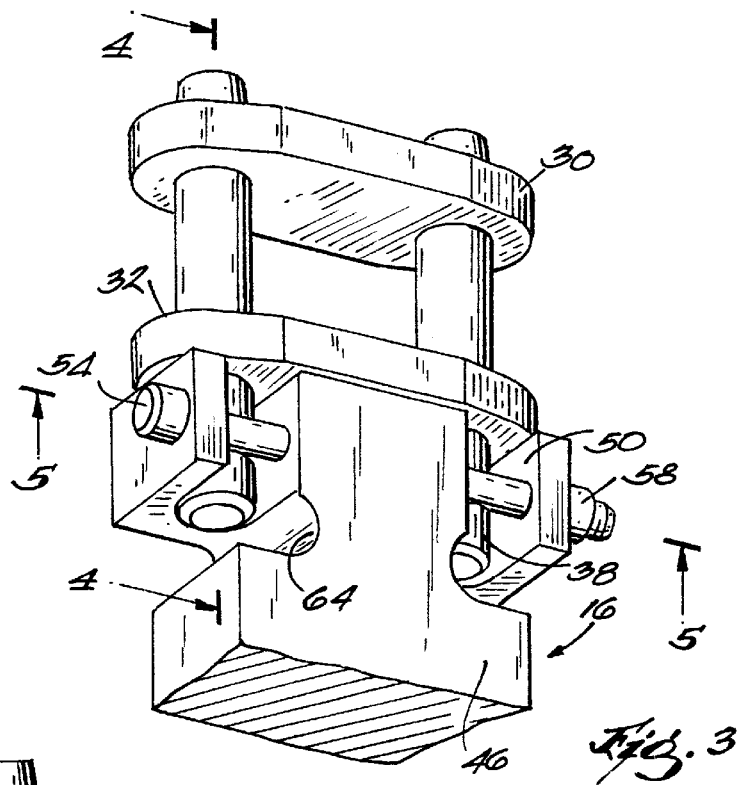
FIG. 3 is a perspective view of the flight and part of the drive chain shown in FIG. 2.

More particularly, a predetermined corresponding number of the journal pins on each of the chains 14 comprises extended flight attachment pins having additional length forming pin extensions 38 facing the opposite chain. Further, the conveying flights 16 are connected between the corresponding number of the pin extensions 38, the flights 16 being in the form of a bar member having two opposite ends 40 and 42, four sides and a bottom surface 46,as shown in FIGS. 2 and 3. The bar member bottom surface 46 has at least one receiving indentation 50, at least one of which is provided on each of the bar member ends, each of the receiving indentations 50 being adapted to receive its respective pin extensions 38. Further, a bolt 54 extends through a bore 53 in the flight sides 55 forming the indentation 50, the bolt being secured to the flight 14 by a nut 58 so that the pin extensions 38 are held in the indentations 50.

Figure 4:
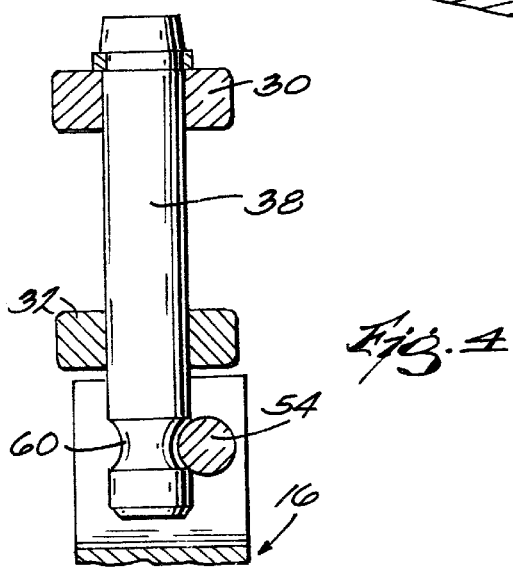
FIG. 4 is a cross sectional view of the flight and part of the drive chain taken along the line 4—4 in FIG. 3.
Figure 5:
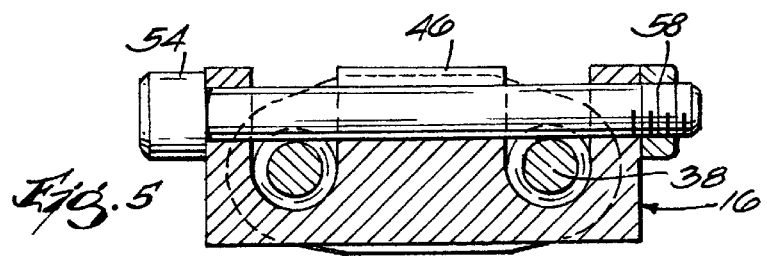
FIG. 5 is a cross sectional view of the flight and part of the drive chain taken along the line 5—5 in FIG. 3.

In order to facilitate the handling of the chains 22 and flights 16 when not held together in the confines of the conveying bed 12, the chains 22 and flights 16 further include means holding the pin extensions 38 so that the pin extensions 38 can not be retracted from the receiving indentations 50. More particularly, as shown in FIGS. 3, 4 and 5, the retraction preventing means comprises a groove 60 in at least one of the pin extensions 38 and extending parallel to the direction of travel of the chains 22 so that the pin extension 38 securely receives the bolt 54 and the pin extension 38 is held between the bolt 54 and the flight 16. In another less preferred embodiment, a retaining ring (not shown) larger than the receiving indentations 50 is secured to the ends of the extended pins 38 in side indentations 64 so as to prevent the extended pins 38 from being pulled out of the receiving indentations 50.

In the operation of the present invention, the conveyor chain-flight assembly 10 may be assembled as a unit or may be assembled as discrete chains 14 which are installed on a shuttle car or rock crusher with the flights 16 being installed later. Due to the attachment mechanism disclosed herein, the flights 16 may be installed or removed when the chains 14 are under tension from sprockets 17 and without disrupting either chain 14.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. A chain and flight conveyor adapted to be driven by a toothed sprocket, comprising:

a pair of spaced apart, parallel driving chains, each of said driving chains comprising:

roller links having at least one end surface which may be drivingly engaged by the teeth of said sprocket and having internal apertures defining drive surfaces which may be drivingly engaged by the teeth of said sprocket;

connecting links coupled to and interconnecting said roller links; and pins pivotally connecting the connecting links to the roller links, a predetermined corresponding number of said pins on each of said chains comprising extended flight attachment pins having pin extensions facing the opposite chain, a plurality of conveying flights connected between said corresponding number of said pin extensions, said flights comprising a bar member having two opposite ends, four sides and a bottom surface, said bar member bottom surface having at least one indentation provided on each of the bar member ends, each of said indentations being adapted to receive its respective pin extensions, and a bolt extending through the flight sides forming said indentation, said bolt being secured to said flight so that said pin extensions are held in said indentations.

2. Apparatus of claim 1 and further including means holding said pin extensions so that said pin extensions can not be retracted from said indentations.

3. Apparatus of claim 2 wherein said retraction preventing means comprises a groove in at least one of said pin extensions and extending parallel to the direction of travel of said chains so that said pin extension securely receives said bolt and said pin extension is held between said bolt and said flight.

* * * * *